(12) United States Patent
Fang et al.

(10) Patent No.: US 8,537,882 B2
(45) Date of Patent: Sep. 17, 2013

(54) METHOD, SYSTEM, AND DEVICE FOR RAPIDLY EXITING TRAINING

(75) Inventors: Liming Fang, Shenzhen (CN); Raphael Cendrillon, Hong Kong (CN); Pengrui Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 236 days.

(21) Appl. No.: 13/097,950

(22) Filed: Apr. 29, 2011

(65) Prior Publication Data

US 2011/0206102 A1 Aug. 25, 2011

Related U.S. Application Data

(63) Continuation of application No. PCT/CN2009/074543, filed on Oct. 21, 2009.

(30) Foreign Application Priority Data

Oct. 31, 2008 (CN) .......................... 2008 1 0172309

(51) Int. Cl.
*H04B 1/38* (2006.01)
*H04L 5/16* (2006.01)
(52) U.S. Cl.
USPC .......................................... 375/222; 375/350
(58) Field of Classification Search
None
See application file for complete search history.

(56) References Cited

U.S. PATENT DOCUMENTS

| 2003/0112861 A1 | 6/2003 | Erdogan et al. | |
|---|---|---|---|
| 2006/0029148 A1* | 2/2006 | Tsatsanis | 375/267 |

FOREIGN PATENT DOCUMENTS

| CA | 2610814 A1 | 12/2006 |
|---|---|---|
| CN | 1904942 A | 1/2007 |
| CN | 1918811 A | 2/2007 |
| CN | 101197592 A | 6/2008 |
| CN | 101213826 A | 7/2008 |
| JP | 20070274714 A | 10/2007 |
| WO | 2008/024967 A2 | 2/2008 |
| WO | WO 2010/048861 A1 | 5/2010 |

OTHER PUBLICATIONS

Supplementary European Search Report issued in corresponding European Patent Application No. 09 82 3053; mailed Jun. 28, 2012.
Duvaut, Patrick et al. "Adaptive Off-Diagonal MIMO Pre-Coder (ODMP) for Downstream DSL Self FEXT Cancellation" IEEE. 2007:2910-2915.
Office Action issued in corresponding Chinese Patent Application No. 200810172309.3, mailed Oct. 10, 2012.
Written Opinion of the International Searching Authority issued in corresponding PCT Patent Application No. PCT/CN2009/074543, mailed Jan. 21, 2010.

* cited by examiner

*Primary Examiner* — David Oveissi
(74) *Attorney, Agent, or Firm* — Brinks Hofer Gilson & Lione

(57) ABSTRACT

A method, a system, and a device for rapidly exiting training are provided. The method includes: in a training procedure of a Vectored-Digital Subscriber Line (DSL) filter, comparing a feedback error value of the filter and/or a swing range of a filter coefficient with a preset threshold, and determining whether the filter meets a convergence condition according to a comparison result; and exiting the training procedure of the filter when the filter meets the convergence condition. The method, system, and device are applicable to a training procedure of a Vectored-DSL precoder or canceller, so as to rapidly exit the training procedure.

6 Claims, 8 Drawing Sheets

METHOD, SYSTEM, AND DEVICE FOR RAPIDLY EXITING TRAINING

CROSS-REFERENCE TO RELATED APPLICATIONS

This application is a continuation of International Application No. PCT/CN2009/074543, filed on Oct. 21, 2009, which claims priority to Chinese Patent Application No. 200810172309.3, filed on Oct. 31, 2008, both of which are hereby incorporated by reference in their entireties.

FIELD OF THE INVENTION

The present invention relates to a Vectored-Digital Subscriber Line (DSL) technology in the field of communications, and more particularly to a method, a system, and a device for rapidly exiting training.

BACKGROUND OF THE INVENTION

The xDSL is a high-speed data transmission technology for transmitting data in telephone twisted-pair cables. With the increase of a frequency band used by the xDSL, a problem of high frequency crosstalk becomes more prominent. When multiple subscribers need to launch an xDSL service in a bundle of cables, due to the crosstalk problem, rates of some lines become lower, performance of them becomes unstable, and sometimes the service even cannot be launched. As a result, a Digital Subscriber Line Access Multiplexer (DSLAM) has a low line activation rate. Multiple twisted-pair cables are present on the cables of the subscribers, and various services may run on each twisted-pair cable. When various types of xDSLs work simultaneously, crosstalk is generated between the lines, and the performance of some lines drops sharply due to the crosstalk problem. When the lines are longer, lines of some twisted-pair cables cannot launch any forms of DSL services at all.

In the prior art, joint transmission and reception are performed by using a precoder or canceller at a DSLAM end, and crosstalk interference is cancelled by using a signal processing method, so that crosstalk in each path of signal is eventually eliminated.

In a training procedure, the training time of the precoder or canceller is always a fixed and high value, so that the precoder or canceller has great interference on adjacent subscribers during a training procedure, or even leads to call drops of other subscribers when the interference is serious.

SUMMARY OF THE INVENTION

Embodiments of the present invention provide a method, a system, and a device for rapidly exiting training, so as to exit a training procedure in time, and reduce interference to adjacent subscribers.

In order to achieve the objective, a method for rapidly exiting training provided in an embodiment of the present invention includes the following steps:

in a training procedure of a Vectored-DSL filter, comparing a feedback error value of the filter and/or a swing range of a filter coefficient with a preset threshold, and determining whether the filter meets a convergence condition according to a comparison result; and exiting the training procedure of the filter when the filter meets the convergence condition.

A system for rapidly exiting training provided in an embodiment of the present invention includes:

a DSLAM, connected to transceivers of a plurality subscriber ends through a DSL, where a Vectored-DSL filter of the DSLAM transmits a pairwise orthogonal sequence in a training procedure with the transceivers of the plurality of subscriber ends; and the DSLAM is configured to determine whether the filter meets a convergence condition, and exit the training procedure of the filter when the filter meets the convergence condition, in the training procedure of the Vectored-DSL filter.

A DSLAM provided in an embodiment of the present invention includes:

a Vectored-DSL filter, configured to process data between the DSLAM and transceivers of subscriber ends to inhibit crosstalk;

a determination module, configured to compare a feedback error value of the filter and/or a swing range of a filter coefficient with a preset threshold, and determine whether the filter meets a convergence condition according to a comparison result, in a training procedure of the Vectored-DSL filter; and an exit module, configured to exit the training procedure of the filter when the determination module determines that the filter meets the convergence condition.

The present invention has the following advantages:

In a training procedure of a Vectored-DSL precoder or canceller, the precoder or canceller exits the training procedure in time, so that time of the training procedure is shortened, the interference of the precoder or canceller to other subscribers in the training procedure is reduced, and probability of call drops of other subscribers is lowered.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description illustrate only some embodiments of the present invention, and persons of ordinary skill in the art can derive other drawings from the accompanying drawings without creative efforts.

DETAILED DESCRIPTION OF THE EMBODIMENTS

The technical solutions of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 1:
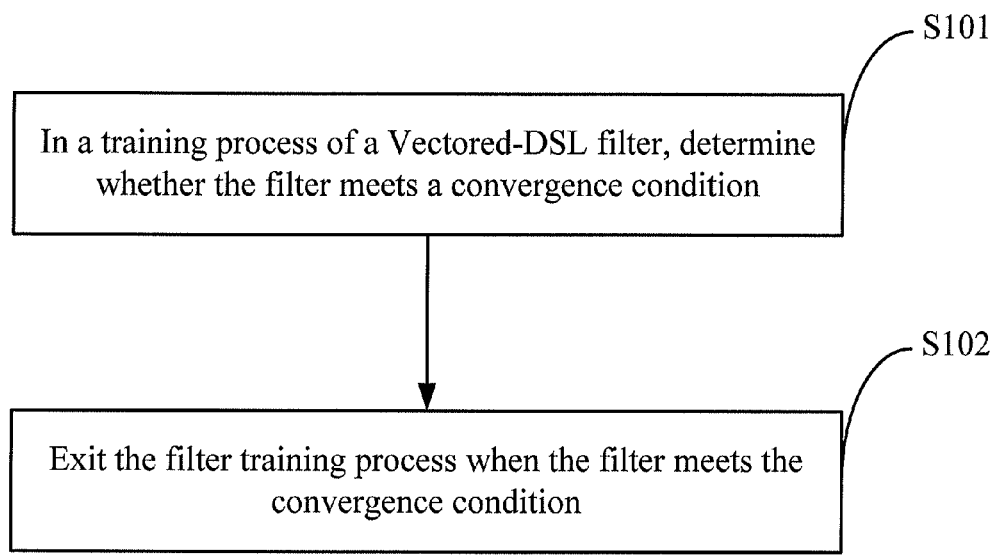
FIG. 1 is a flow chart of a method for rapidly exiting training according to a first embodiment of the present invention.

A first embodiment of the present invention provides a method for rapidly exiting training. As shown in FIG. 1, the method includes the following steps.

Step S101: In a training procedure of a Vectored-DSL filter, determine whether the filter meets a convergence condition.

Step S102: Exit the training procedure of the filter when the filter meets the convergence condition.

In the embodiment of the present invention, it can be known that in a training procedure of a Vectored-DSL precoder or canceller, the precoder or canceller exits the training procedure in time, so that time of the training procedure is shortened, interference of the precoder or canceller to other subscribers in the training procedure is reduced, and probability of call drops of other subscribers is lowered.

Figure 2:
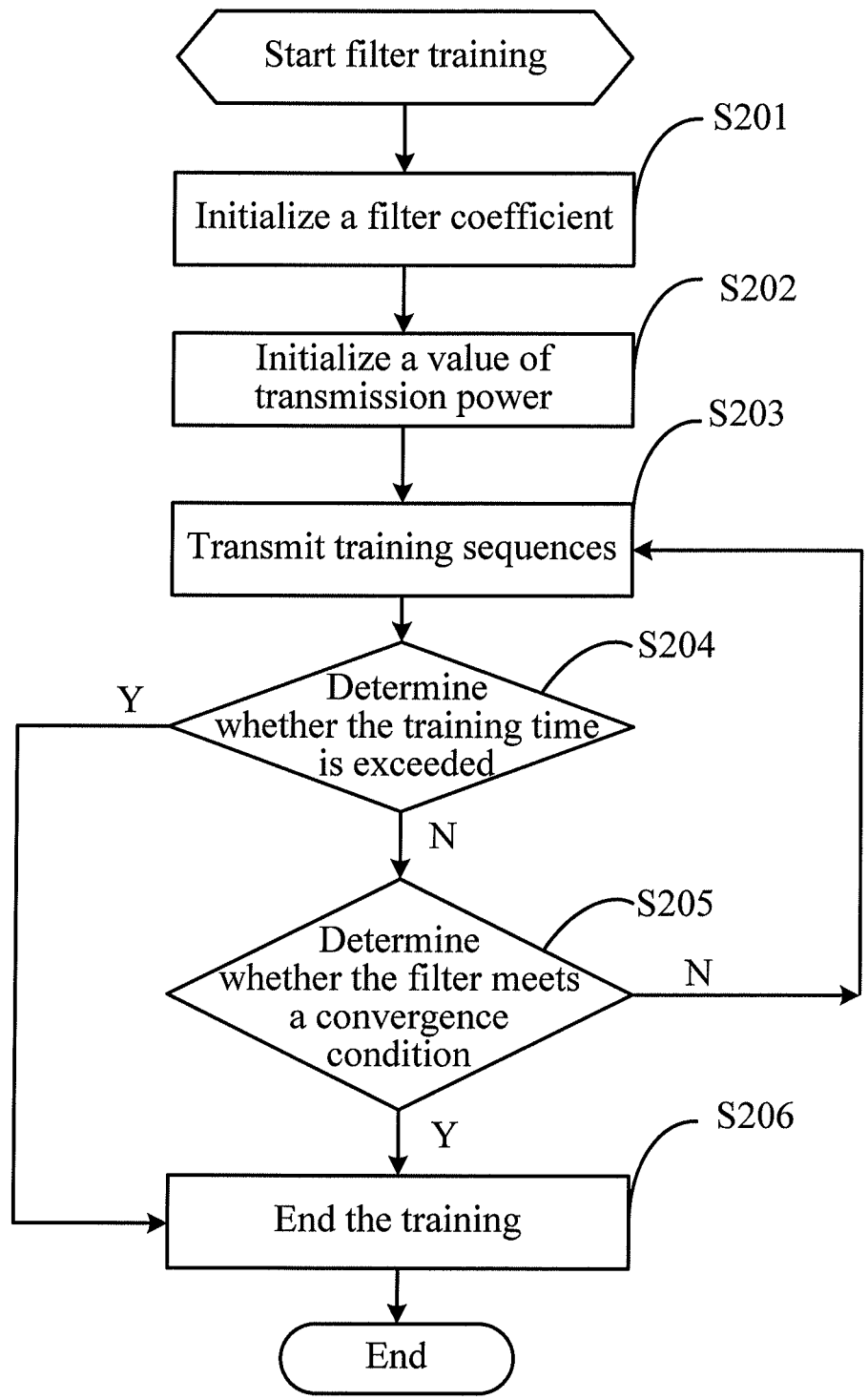
FIG. 2 is a flow chart of a method for rapidly exiting training according to a second embodiment of the present invention.

A second embodiment of the present invention provides a method for rapidly exiting training. As shown in FIG. 2, the method includes the following steps:

Step S201: A DSLAM initializes a filter coefficient after filter training starts.

Figure 3:
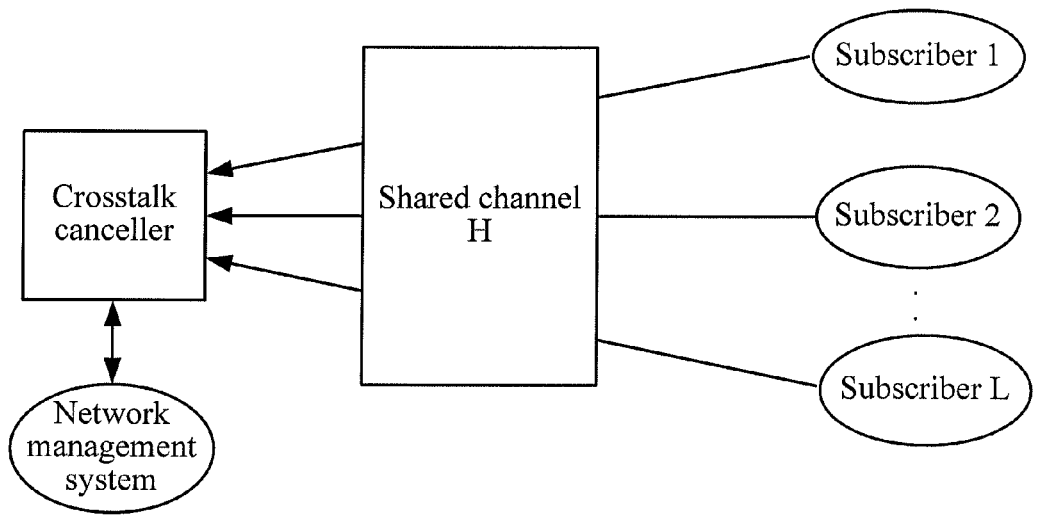
FIG. 3 is a schematic diagram of transmission from a subscriber end to a central office according to the second embodiment of the present invention.
Figure 4:
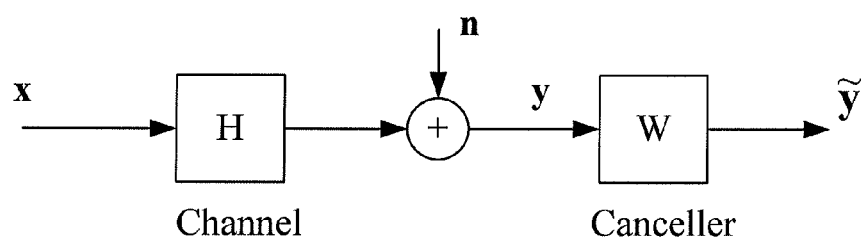
FIG. 4 is a schematic diagram of an implementation of cancellation from a subscriber end to a central office according to the second embodiment of the present invention.

Specifically, when crosstalk of a Vectored-DSL is cancelled, an uplink direction and a downlink direction are involved in the implementation. Transmission in the uplink direction refers to transmission from a subscriber end to a central office. As shown in FIG. 3, in the uplink transmission, the receiving end performs joint receiving and processing on data received from subscribers, and a crosstalk canceller is used to cancel a crosstalk signal at the receiving end. The specific implementation mode is shown in FIG. 4. By designing the filter at the receiving end, the joint crosstalk cancellation is performed on received data, so as to guarantee that no crosstalk interference exists in the data received from the subscribers. The filter designed at the receiving end may be a canceller, and a coefficient of the canceller is W. During the initialization, W may be preset to a default value or 0, and the value of W may vary with time.

Figure 5:
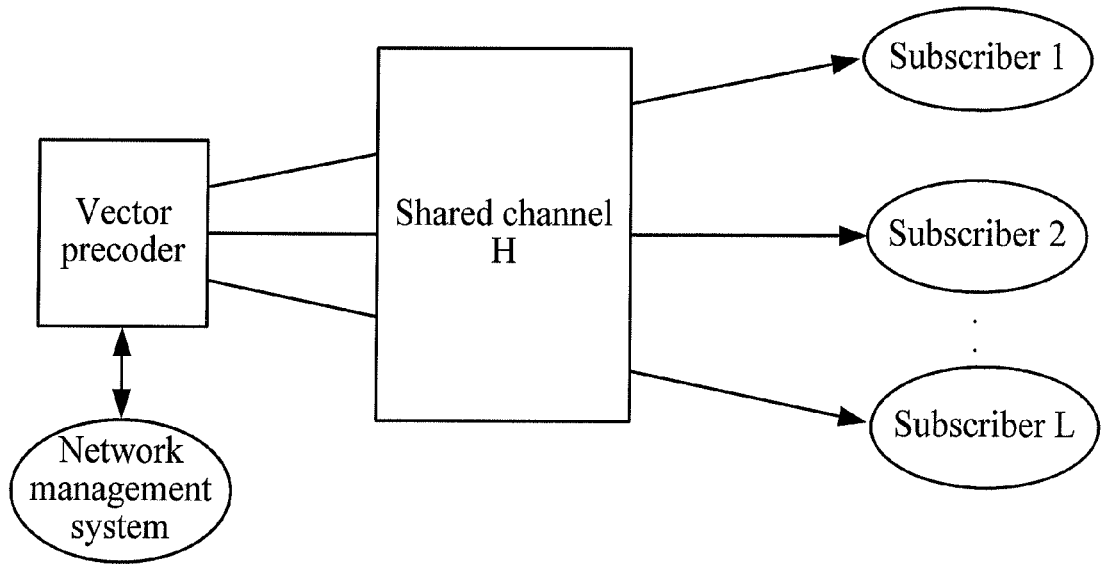
FIG. 5 is a schematic diagram of transmission from a central office to a subscriber end according to the second embodiment of the present invention.
Figure 6:
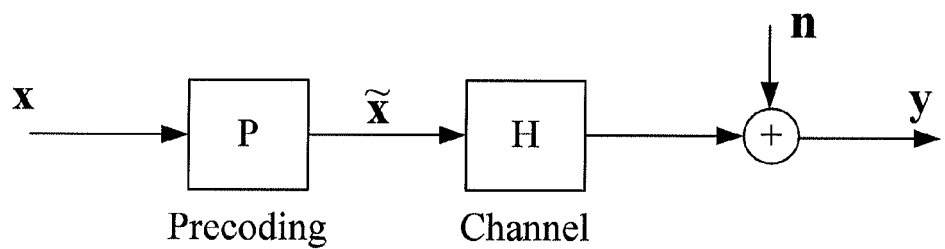
FIG. 6 is a schematic diagram of an implementation of cancellation from a central office to a subscriber end according to the second embodiment of the present invention.

Similarly, transmission in the downlink direction refers to transmission from a central office to a subscriber end. As shown in FIG. 5, during the downlink transmission, precoding is performed at a transmission end to inhibit crosstalk in a line. The specific implementation mode is shown in FIG. 6. By designing the filter at the transmission end, the preprocessing is performed on the transmitted data, so as to guarantee that no crosstalk interference exists in the data transmitted to the subscribers. The filter designed at the transmission end is a precoder, and a coefficient of the precoder is P. During initialization, the P may be preset to a default value or 0, and the value of P may vary with time.

Step S202: The DSLAM initializes a value of transmission power.

Specifically, the transmission power is selected according to empirical values, and is generally a small value or a conservative value. Step S201 may be performed before or after step S202.

Step S203: A transceiver transmits training sequences.

Specifically, in the uplink direction, each subscriber transmits a pairwise orthogonal sequence by using respective transceiver, in which the pairwise orthogonal sequence may be selected from a Hadamard matrix, and the DSLAM calculates a feedback error value according to the received sequences, and calculates a crosstalk channel matrix according to the feedback error value. In the downlink direction, the DSLAM transmits the pairwise orthogonal sequence to the subscribers, in which the pairwise orthogonal sequence may be selected from a Hadamard matrix, the subscribers calculate a feedback error value according to the received sequences, and transmit feedback error information to the DSLAM, and the DSLAM acquires the feedback error value according to the feedback error information, and calculates a crosstalk channel matrix according to the feedback error value, in which the feedback error information is acquired by scaling the feedback error value.

In this embodiment, the DSLAM may calculate the crosstalk channel matrix according to Formula (1) in the following:

$$H_m[T] = \frac{1}{\alpha^2} \frac{1}{T} \sum_{k=1}^{T} X_m^*[t_k] E_m[t_k] \quad (1)$$

where $\alpha$ is a power coefficient, T is a total number of symbols, X is the transmitted sequence (Hadamard), E is the feedback error value, t is a $t^{th}$ symbol, and H is a crosstalk channel coefficient.

Step S204: The DSLAM determines whether training time of the filter is exceeded. If the training time is exceeded, step S206 is performed; if the training time is not exceeded, step S205 is performed. The determining whether the training time of the filter is exceeded may specifically include presetting a time. The preset time may be selected according to empirical values, and it is determined that the training time is exceeded when the training time of the filter exceeds the preset time.

Step S205: The DSLAM determines whether the filter meets a convergence condition, according to the feedback error value and/or the filter coefficient. If the filter meets the convergence condition, step 206 is performed; if the filter does not meet the convergence condition, step 203 is performed.

Figure 7:
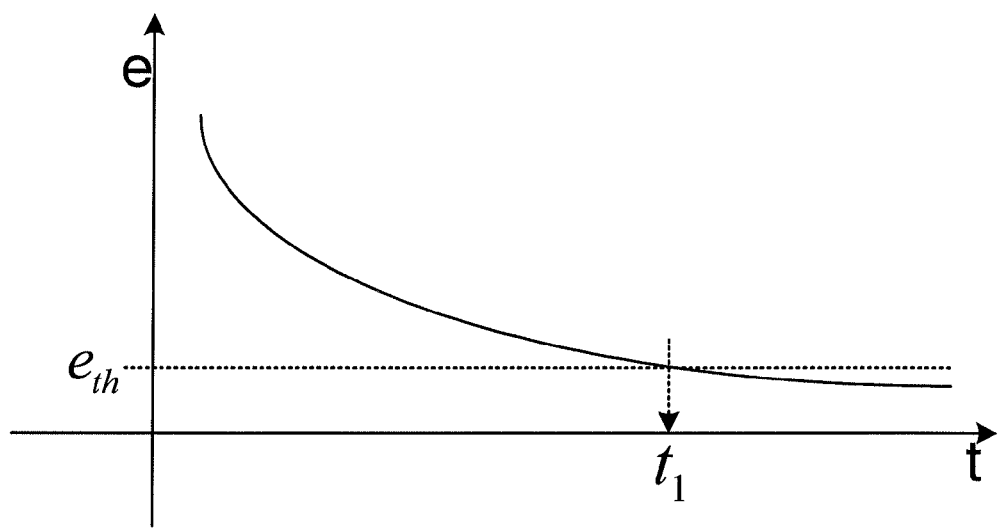
FIG. 7 is a schematic diagram of determining whether a filter converges according to the second embodiment of the present invention.

Specifically, the convergence condition of the filter includes, but is not limited to, the following: the feedback error value is not greater than a preset threshold $e_{th}$, in which the threshold $e_{th}$ is determined according to historical experiences and may vary. As shown in FIG. 7, at time t1, the feedback error value is not greater than the preset threshold $e_{th}$, that is, the convergence condition is met. Therefore, it is determined that the filter converges.

Figure 8:
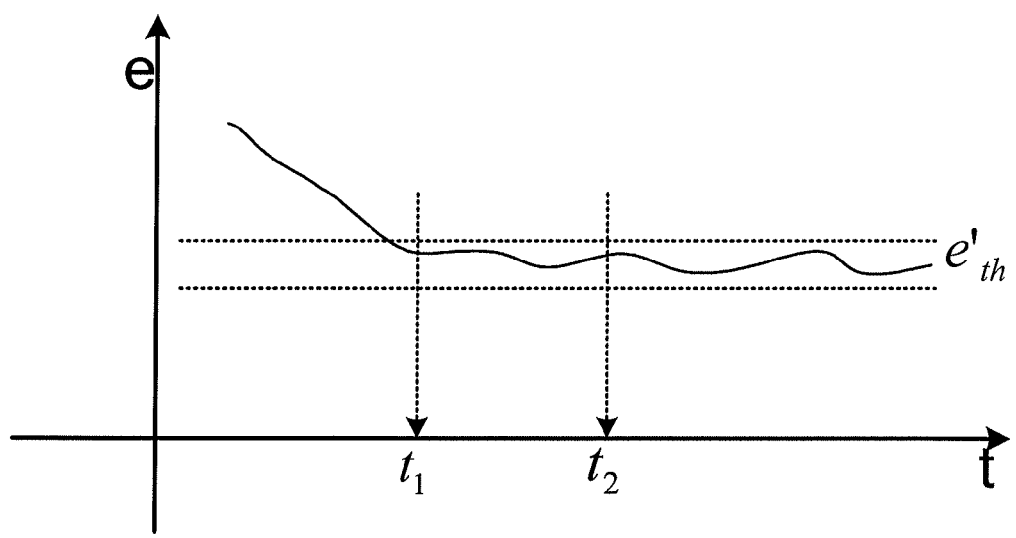
FIG. 8 is another schematic diagram of determining whether a filter converges according to the second embodiment of the present invention.

Alternatively, the variance of the filter coefficients P and W is stable in an observation time period, that is, a swing range is smaller than a preset threshold $e'_{th}$, in which the threshold $e'_{th}$ is determined according to historical experiences and may vary. As shown in FIG. 8, the difference of the swing ranges in the observation time period (t1-tn) is found according to formulas in the following:

$$e_{max} = \max(P_{mn}(k,t_1), P_{mn}(k,t_2), \ldots P_{mn}(k,t_n))$$

$$e_{min} = \min(P_{mn}(k,t_1), P_{mn}(k,t_2), \ldots P_{mn}(k,t_n))$$

$$\Delta e = |e_{max} - e_{min}|.$$

When $\Delta e$ is smaller than $e'_{th}$, the convergence condition is met, and when $\Delta e$ is not smaller than $e'_{th}$, the convergence condition is not met. $P_{mn}(k,t)$ denotes a coefficient of the precoder for an $n^{th}$ subscriber to an $m^{th}$ subscriber at time t corresponding to a $k^{th}$ sub-carrier.

That is, if the swing range of the filter coefficient is smaller than a certain preset threshold $e'_{th}$, the convergence condition is met, and it is determined that the filter converges. When the filter meets the convergence condition, the training does not need to be continued, and is stopped.

Step S206: Transmit a message of ending the training of the filter to a peer end, and end the current stage of the filter training.

In this embodiment, it can be known that in a training procedure of a Vectored-DSL precoder or canceller, the precoder or canceller exits the training procedure in time, so that time of the training procedure is shortened, interference of the precoder or canceller to other subscribers in the training procedure is reduced, and probability of call drops of other subscribers is lowered.

Figure 9:
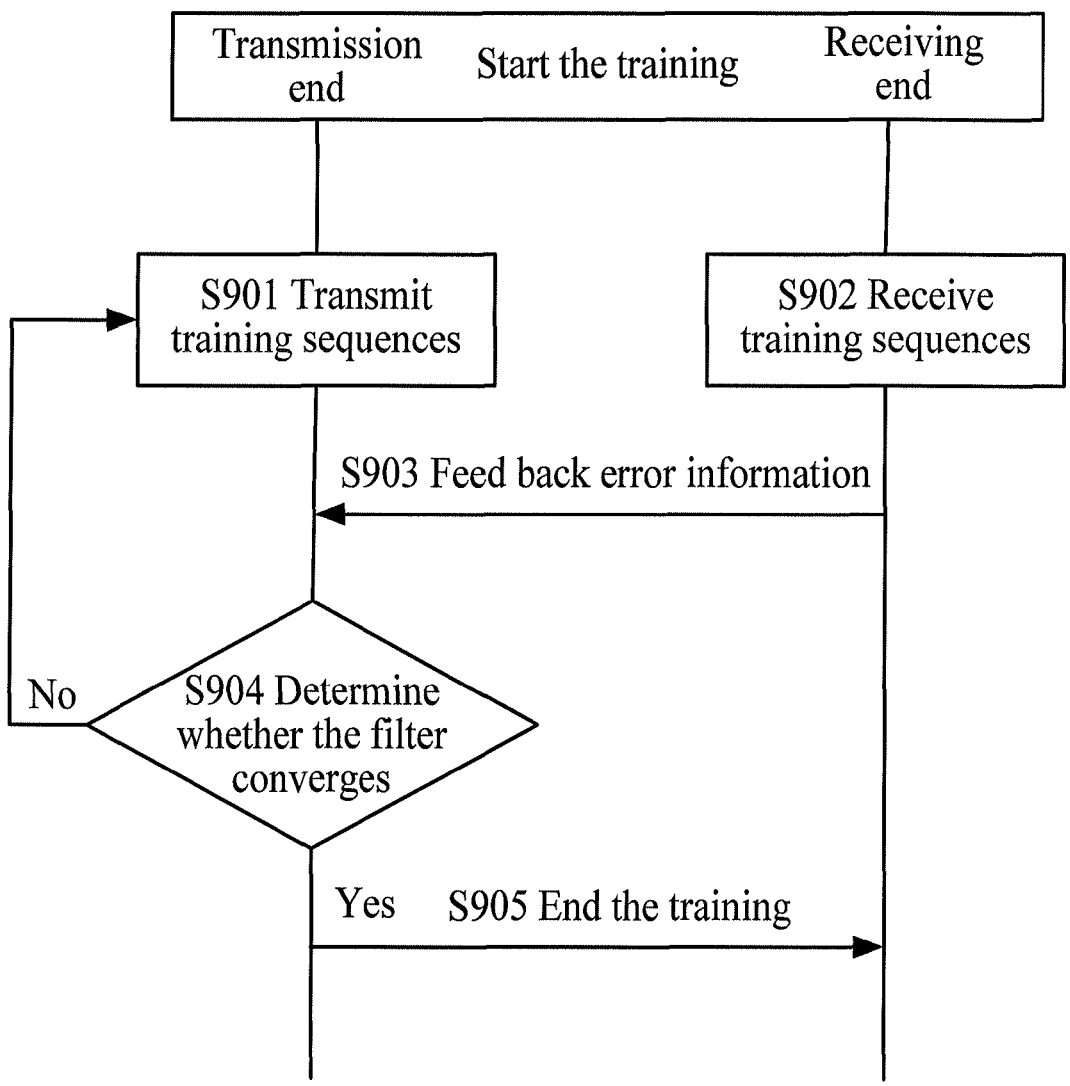
FIG. 9 is a schematic flow chart of a training procedure of a downlink filter according to an embodiment of the present invention.

An embodiment of the present invention provides a method for rapidly exiting training applicable to a training procedure of a downlink filter. As shown in FIG. 9, the method includes the following steps.

Step S901: A transmission end transmits training sequences.

Like step S203, the training sequences may be pairwise orthogonal sequences, which are specifically selected from a Hadamard matrix.

Step S902: A receiving end receives the training sequences.

Specifically, step S901 and step S902 are simultaneously carried out, that is, the receiving end starts to receive the training sequences when the transmission end transmits the training sequences.

Step S903: The receiving end transmits feedback error information to the transmission end.

In a downlink direction, the receiving end feeds back the error information to the transmission end through a Back channel. The Back channel may be a lower layer SOC channel, or an upper layer ($2^{nd}$ layer) feedback channel. In an uplink direction, the receiving end directly calculates and processes an error without a feedback process.

Step S904: Acquire a feedback error value according to the feedback error information at the transmission end, and determine whether the feedback error value is smaller than a preset threshold $e_{th}$. If it is determined that the feedback error value is smaller than the preset threshold $e_{th}$, it is determined that the filter converges, and a message of stopping training is transmitted to the receiving end, so that the training ends ahead of time, and step S905 is performed; if it is determined that the feedback error value is not smaller than the preset threshold $e_{th}$, it is determined that the filter does not converge, the training sequences are continuously transmitted, and step S901 is performed until the training ends.

In this embodiment, before the receiving end transmits the feedback error value to the transmission end, the feedback error value may be scaled, so as to generate the feedback error information, thereby facilitating the transmission or improving the transmission accuracy. After receiving the feedback error information, the transmission end performs a reverse process on the feedback error information to acquire the feedback error value. For example, the receiving end may reduce the feedback error value (error) by a times (error/a), so as to generate the feedback error information and transmit the feedback error information to the transmission end. After receiving the feedback error information (error/a), the transmission end amplifies the feedback error information by a times (error/a×a) to acquire the feedback error value (error).

Step S905: The transmission end transmits a message to the receiving end, so as to notify the receiving end of exiting the training procedure of the filter at the same time as the transmission end.

Specifically, when the training time exceeds a preset threshold, the transmission end transmits a message of stopping training to the receiving end to end the training.

In this embodiment, it can be known that in a training procedure of a Vectored-DSL precoder or canceller, the precoder or canceller exits the training procedure in time, so that time of the training procedure is shortened, interference of the precoder or canceller to other subscribers in the training procedure is reduced, and probability of call drops of other subscribers is lowered.

Figure 10:
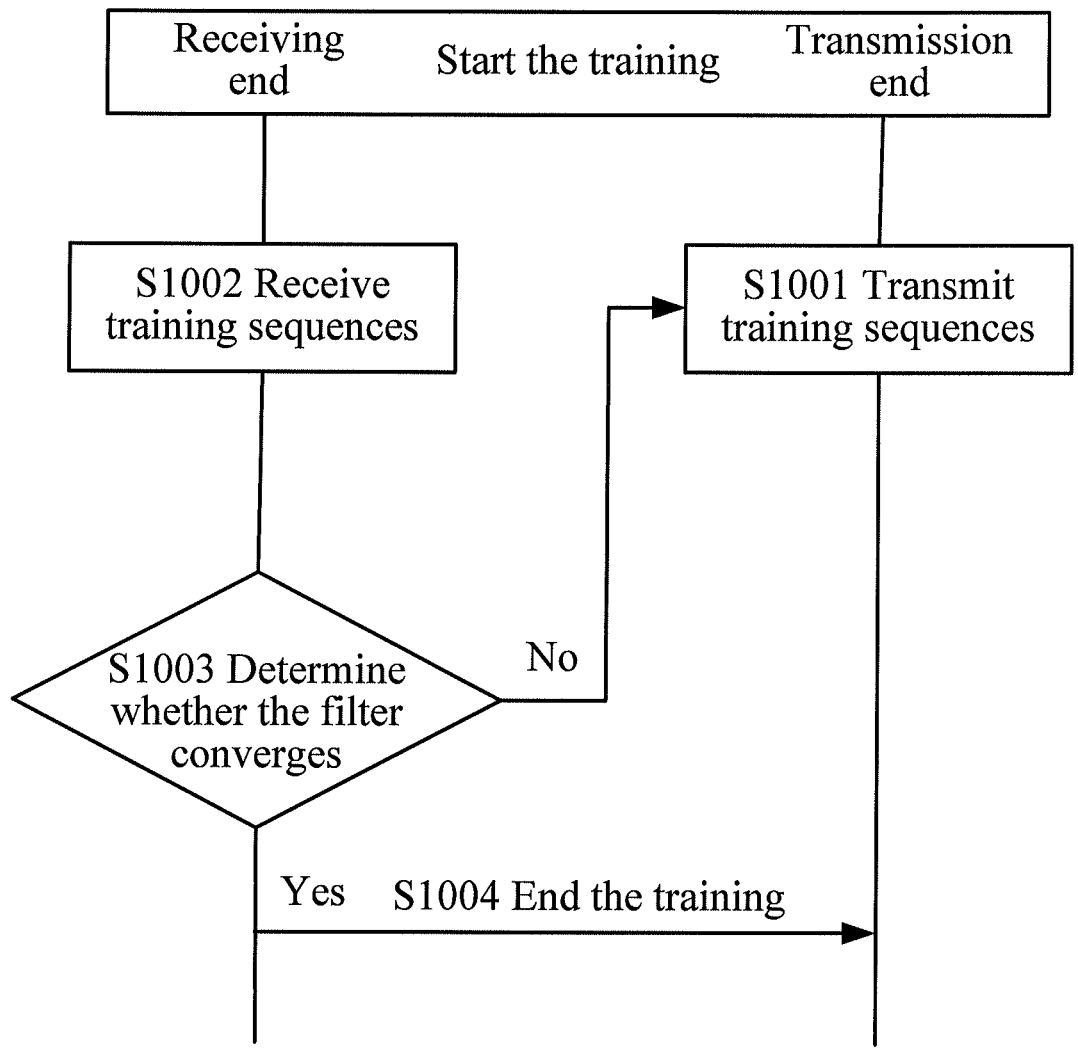
FIG. 10 is a schematic flow chart of a training procedure of an uplink filter according to an embodiment of the present invention.

Likewise, an embodiment of the present invention provides a method for rapidly exiting training, applied to a training procedure of an uplink filter. As shown in FIG. 10, the method includes the following steps:

Step S1001: A transmission end transmits training sequences.

Like step 203, the training sequences may be pairwise orthogonal sequences, which are specifically selected from a Hadamard matrix.

Step S1002: The receiving end receives the training sequences.

Specifically, step S1001 and step S1002 are simultaneously carried out, that is, the receiving end starts to receive the training sequences when the transmission end transmits the training sequences.

Step S1003: The receiving end acquires a feedback error value, and determines whether the feedback error value is smaller than a preset threshold $e_{th}$. If it is determined that the feedback error value is smaller than the preset threshold $e_{th}$, it is determined that the filter converges, and a message of stopping training is transmitted to the receiving end, so that the training ends ahead of time, and step S1004 is performed; if it is determined that the feedback error value is not smaller than the preset threshold $e_{th}$, it is determined that the filter does not converge, the training sequences are continuously transmitted, and step S1001 is performed until the training ends.

Step S1004: The receiving end transmits a message to the transmission end, so as to notify the transmission end of exiting the training procedure of the filter at the same time.

Specifically, when the training time exceeds a preset threshold, the receiving end transmits a message of stopping training to the transmission end to end the training.

In this embodiment, it can be known that in a training procedure of a Vectored-DSL precoder or canceller, the precoder or canceller exits the training procedure in time, so that time of the training procedure is shortened, interference of the precoder or canceller to other subscribers in the training procedure is reduced, and probability of call drops of other subscribers is lowered.

An embodiment of the present invention further provides a system for rapidly exiting training, which includes a DSLAM, connected to transceivers of a plurality of subscriber ends through a DSL.

A Vectored-DSL filter of the DSLAM transmits a pairwise orthogonal sequence in a training procedure with the transceivers of the plurality of subscriber ends.

The DSLAM is configured to determine whether the filter meets a convergence condition, and exit the training procedure of the filter when the filter meets the convergence condition, in the training procedure of the Vectored-DSL filter.

The DSLAM is further configured to acquire a feedback error of the filter, determine that the filter meets the convergence condition when determining that the feedback error is not greater than a preset threshold $e_{th}$, and exit the training procedure of the filter.

The DSLAM is further configured to determine that the filter meets the convergence condition when determining that a swing range of the filter is smaller than a preset threshold $e'_{th}$, and exit the training procedure of the filter.

The specific implementation method of the system for rapidly exiting training according to the embodiment of the present invention is as described in the embodiment of the method for rapidly exiting training according to the present invention, and is not described again herein.

In this embodiment, it can be known that in a training procedure of a Vectored-DSL precoder or canceller, the precoder or canceller exits the training procedure in time, so that time of the training procedure is shortened, interference of the precoder or canceller to other subscribers in the training procedure is reduced, and probability of call drops of other subscribers is lowered.

Figure 11:
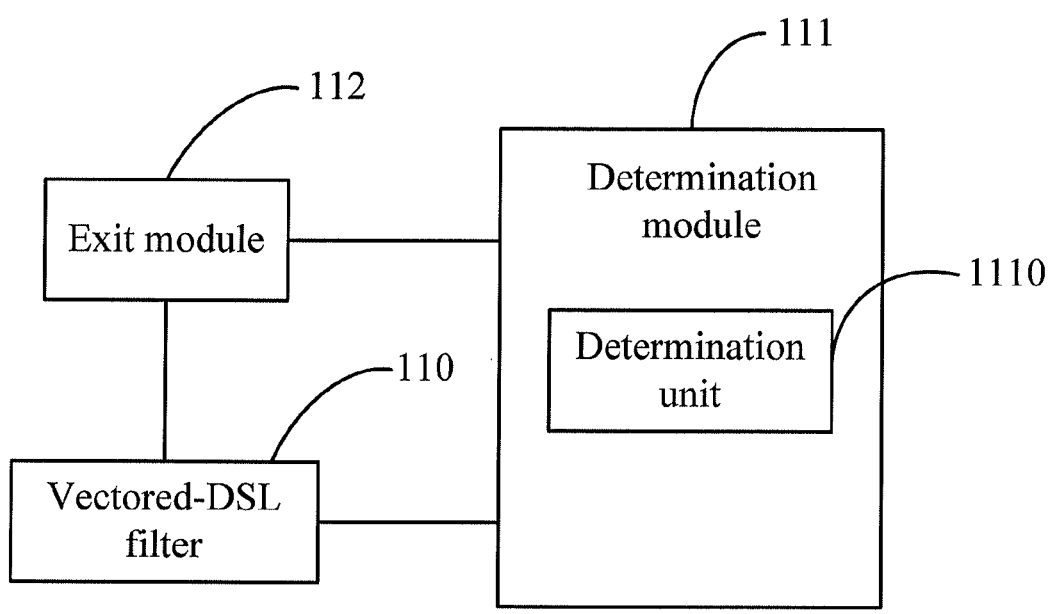
FIG. 11 is a structure diagram of a device for rapidly exiting training according to an embodiment of the present invention.

An embodiment of the present invention further provides a DSLAM. As shown in FIG. 11, the DSLAM includes a Vectored-DSL filter 110, a determination module 111, and an exit module 112.

The Vectored-DSL filter 110 is configured to process data between the DSLAM and transceivers of subscriber ends to inhibit crosstalk.

The determination module 111 is configured to compare a feedback error value of the filter 110 and/or a swing range of a filter coefficient with a preset threshold, and determine whether the filter meets a convergence condition according to a comparison result, in a training procedure of the Vectored-DSL filter 110.

The exit module 112 is configured to exit the training procedure of the filter 110 when the determination module 111 determines that the filter 110 meets the convergence condition.

Further, the determination module 111 includes a determination unit 1110.

The determination unit 1110 is configured to determine that the filter meets the convergence condition when determining that the feedback error value of the filter is not greater than a preset threshold $e_{th}$; and/or determine that the filter meets the convergence condition when determining that the swing range of the filter coefficient is smaller than a preset threshold $e_{th}$.

The specific implementation method of the DSLAM according to the embodiment of the present invention is as described in the embodiment of the method for rapidly exiting training according to the present invention, and is not described again herein.

In this embodiment, it can be known that in a training procedure of a Vectored-DSL precoder or canceller, the precoder or canceller exits the training procedure in time, so that time of the training procedure is shortened, interference of the precoder or canceller to other subscribers in the training procedure is reduced, and probability of call drops of other subscribers is lowered.

Through the descriptions of the foregoing embodiments, persons skilled in the art may clearly understand that the present invention may be implemented by hardware only or by software plus a necessary universal hardware platform. Based on such understandings, the technical solutions of the present invention may be embodied in the form of a software product. The software product may be stored in a non-volatile storage medium (a Compact Disc-Read Only Memory (CD-ROM), a Universal Serial Bus (USB) flash drive, a removable hard disk, a Read Only Memory/Random Access Memory (ROM/RAM), a magnetic disk, or an optical disk). The software product includes a number of instructions that enable a computer device (a personal computer, a server or a network device) to perform the method provided in each embodiment of the present invention.

It should be noted that the above descriptions are merely exemplary embodiments of the present invention, and the present invention is not limited thereto. All variations or replacements that can be easily thought of by persons skilled in the art within the technical scope disclosed in the present invention shall fall within the protection scope of the present invention. Therefore, the protection scope is as defined by the appended claims.

What is claimed is:

1. A method for rapidly exiting training, comprising:
in a training procedure of a Vectored-Digital Subscriber Line (DSL) filter, comparing a feedback error value of the filter with a preset threshold $e_{th}$, and determining whether the filter meets a convergence condition according to a comparison result; wherein the convergence condition is met when the feedback error value of the filter is not greater than the preset threshold $e_{th}$; and
exiting the training procedure of the filter when the filter meets the convergence condition;
wherein the feedback error value of the filter is acquired by:
receiving in an uplink direction, a first pairwise orthogonal sequence transmitted from a subscriber, and calculating the feedback error value based on the first pairwise orthogonal sequence;
in a downlink direction, transmitting a second pairwise orthogonal sequence to the subscriber, receiving feedback error information corresponding to the feedback error value that is calculated by the subscriber based on the second pairwise orthogonal sequence, and deriving the feedback error value according to the feedback error information.

2. The method according to claim 1, wherein an acquiring manner of the feedback error value comprises:
acquiring the feedback error value according to feedback error information returned from a receiving end; or
locally acquiring the feedback error value.

3. The method according to claim 1, wherein an acquiring manner of the swing range of the filter coefficient comprises:
acquiring a maximum value and a minimum value of the filter coefficient in a set time; and
acquiring the swing range of the filter coefficient, wherein the swing range of the filter coefficient is a difference between the maximum and the minimum values of the filter coefficient.

4. The method according to claim 1, wherein before the comparing the feedback error value of the filter and the swing range of the filter coefficient with the preset threshold and determining whether the filter meets the convergence condition according to the comparison result, the method further comprises:
exiting the training procedure when training time exceeds a preset threshold.

5. The method according to claim 1, wherein the filter comprises:
a canceller and/or a precoder.

6. A system for rapidly exiting training, comprising:
a Digital Subscriber Line Access Multiplexer (DSLAM), connected to transceivers of a plurality of subscriber ends through a Digital Subscriber Line (DSL), wherein a Vectored-DSL filter of the DSLAM transmits a pairwise orthogonal sequence in a training procedure with the transceivers of the plurality of subscriber ends; and
the DSLAM is configured to determine whether the filter meets a convergence condition, and exit the training procedure of the filter when the filter meets the convergence condition, in the training procedure of the Vectored-DSL filter; wherein the convergence condition is met when the feedback error value of the filter is not greater than the preset threshold $e_{th}$;
wherein the DSLAM is further configured to acquire the feedback error value of the filter by:
receiving in an uplink direction, a first pairwise orthogonal sequence transmitted from a subscriber, and calculating the feedback error value based on the first pairwise orthogonal sequence;
transmitting in a downlink direction, a second pairwise orthogonal sequence to the subscriber,
receiving feedback error information corresponding to the feedback error value that is calculated by the subscriber based on the second pairwise orthogonal sequence, and deriving the feedback error value according to the feedback error information.

\* \* \* \* \*

UNITED STATES PATENT AND TRADEMARK OFFICE
CERTIFICATE OF CORRECTION

PATENT NO.         : 8,537,882 B2
APPLICATION NO.    : 13/097950
DATED              : September 17, 2013
INVENTOR(S)        : Liming Fang et al.

It is certified that error appears in the above-identified patent and that said Letters Patent is hereby corrected as shown below:

In the Claims

In column 8, claim 4, lines 66-67, after "error value of the filter" delete "and the swing range of the filter coefficient".

Signed and Sealed this
Thirty-first Day of December, 2013

Margaret A. Focarino
*Commissioner for Patents of the United States Patent and Trademark Office*